United States Patent

Head

[11] 4,046,069
[45] Sept. 6, 1977

[54] MEANS FOR CONTROLLING DISCHARGE DOOR MOVEMENT

[75] Inventor: Glenn Dale Head, Des Moines, Iowa

[73] Assignee: Deere & Company, Moline, Ill.

[21] Appl. No.: 656,483

[22] Filed: Feb. 9, 1976

Related U.S. Application Data

[63] Continuation of Ser. No. 496,540, Aug. 12, 1974, abandoned.

[51] Int. Cl.² ............................................ A01D 90/08
[52] U.S. Cl. .................................... 100/255; 100/270; 56/344
[58] Field of Search ........ 100/255, 100, 188, 214–215, 100/245, 258, 270; 56/344–345, 346; 130/20; 214/83.3, 518, 519, 522

[56] References Cited

U.S. PATENT DOCUMENTS

| | | | |
|---|---|---|---|
| 3,732,672 | 5/1973 | Adee et al. | 56/344 X |
| 3,763,771 | 10/1973 | Gerber | 56/346 X |
| 3,826,070 | 7/1974 | Wood | 56/344 |
| 3,842,732 | 10/1974 | Anderson | 100/270 |

Primary Examiner—Stanley N. Gilreath
Assistant Examiner—Arthur O. Henderson

[57] ABSTRACT

An improved means for controlling movement of the discharge door on an agricultural machine between its open and closed position, wherein the movement of associated machine parts is utilized to incur controlled movement of the discharge door.

11 Claims, 3 Drawing Figures

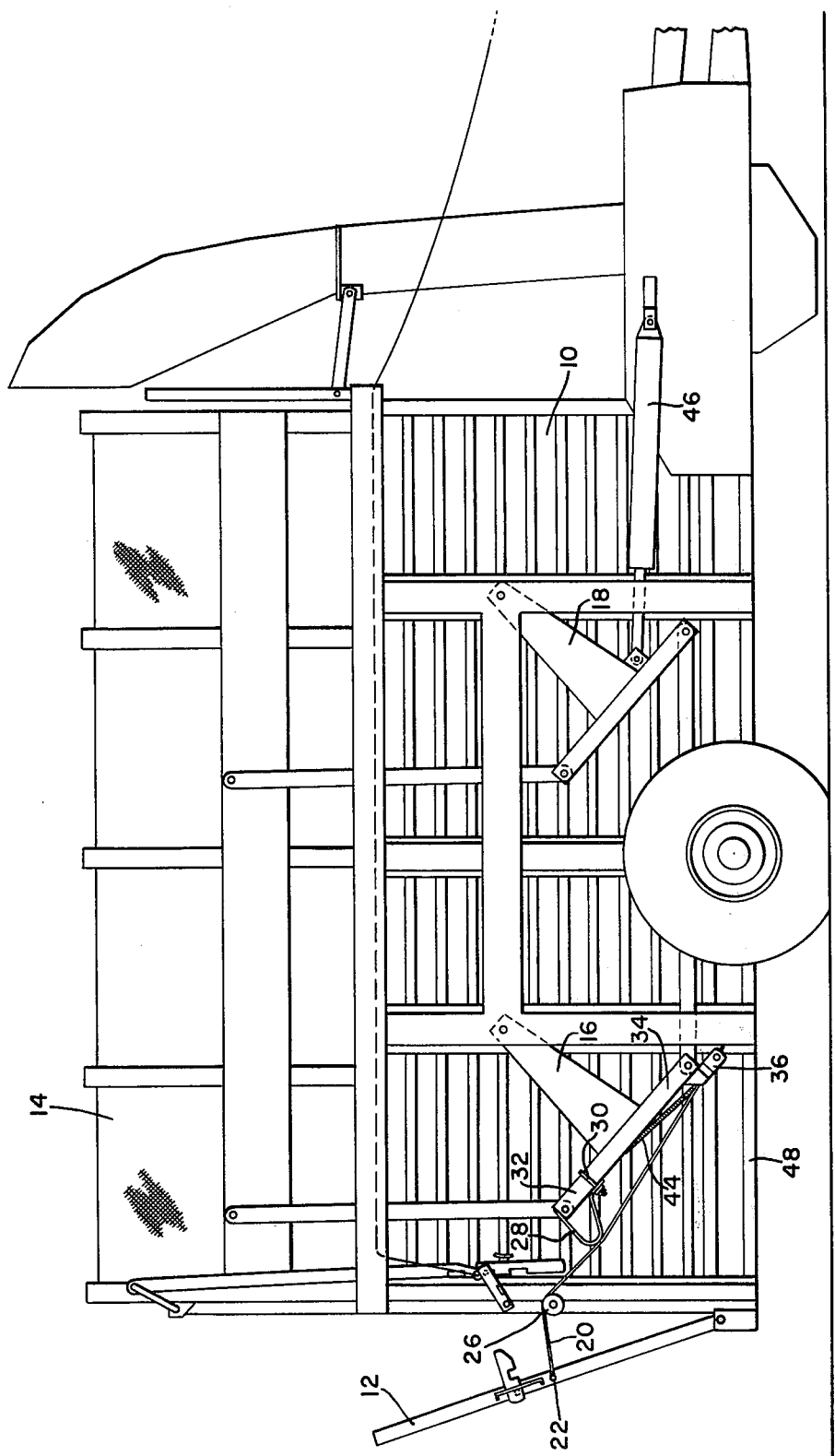

MEANS FOR CONTROLLING DISCHARGE DOOR MOVEMENT

This is a continuation of application Ser. No. 496,540, filed Aug. 12, 1974, and now abandoned.

BACKGROUND OF THE INVENTION

The present invention relates generally to stack-forming equipment and more particularly to a mobile stack-forming implement having a rear door with a mechanical means for controlling movement of the door operatively coupled with the implement's vertical reciprocal stack-forming compression means.

Stack-forming wagons having a vertical reciprocal roof for the container to assist in compressing the crop in the container are well known to the prior art. It is also well known to discharge the completed stack from the container body across the lowered rear door. Various mechanisms have been employed to open and then close the rear door after the stack has been unloaded.

SUMMARY OF THE INVENTION

The principle object of the present invention is to provide an improved rear door closing mechanism. More particularly, it is an object to operatively couple the stack-forming compression means with the rear door to utilize the compression means movement when closing the rear door. It is also an object to provide a mechanism that will control the descent rate of the rear door when it is opening. Yet another object is to provide a closing mechanism that is simple, requires few parts, is reliable in operation, inexpensive to manufacture and economical to maintain.

In pursuance of these and other objects, the invention includes a roof connected to bell cranks on the sides of the container that upon rocking causes the roof to raise or lower and a force-transmitting means or flexible cable interconnecting the rear door and one of the bell cranks, and a guide or sheave secured to the container side frame between the rear opening and said bell crank.

Through utilizing the movement of the bell crank, the door is opened and closed. As a hydraulic cylinder retracts to swing the bell cranks from the rearward tio forward positions to lower the roof, the flexible cable is pulled forwardly around the sheave, causing the lowered door to be raised. As the door reaches a nearly closed position, the bell crank has nearly completed its cycle of movement, and the cable is in a slackened configuration. To eliminate the cable slack and thereby cause the door to close, a movable tightening or cable take-up means secured to said bell crank slidingly contacts the cable and lengthens the path followed by the cable.

To unload a completed stack, the compressor roof must be in a raised position. As the bell crank is rotated to raise the roof, the operator will unlatch the door and the bell crank's rotation can then be utilized to control the rate at which the attached cable lowers the rear door.

BRIEF DESCRIPTION OF THE DRAWINGS

The preferred embodiment of the invention will be described in conjunction with the accompanying drawings in which:

FIG. 1 is a side view of a stack-forming implement with the door partially closed and the roof lift mechanism in its relative position.

DESCRIPTION OF THE PREFERRED EMBODIMENT

Figure 3:
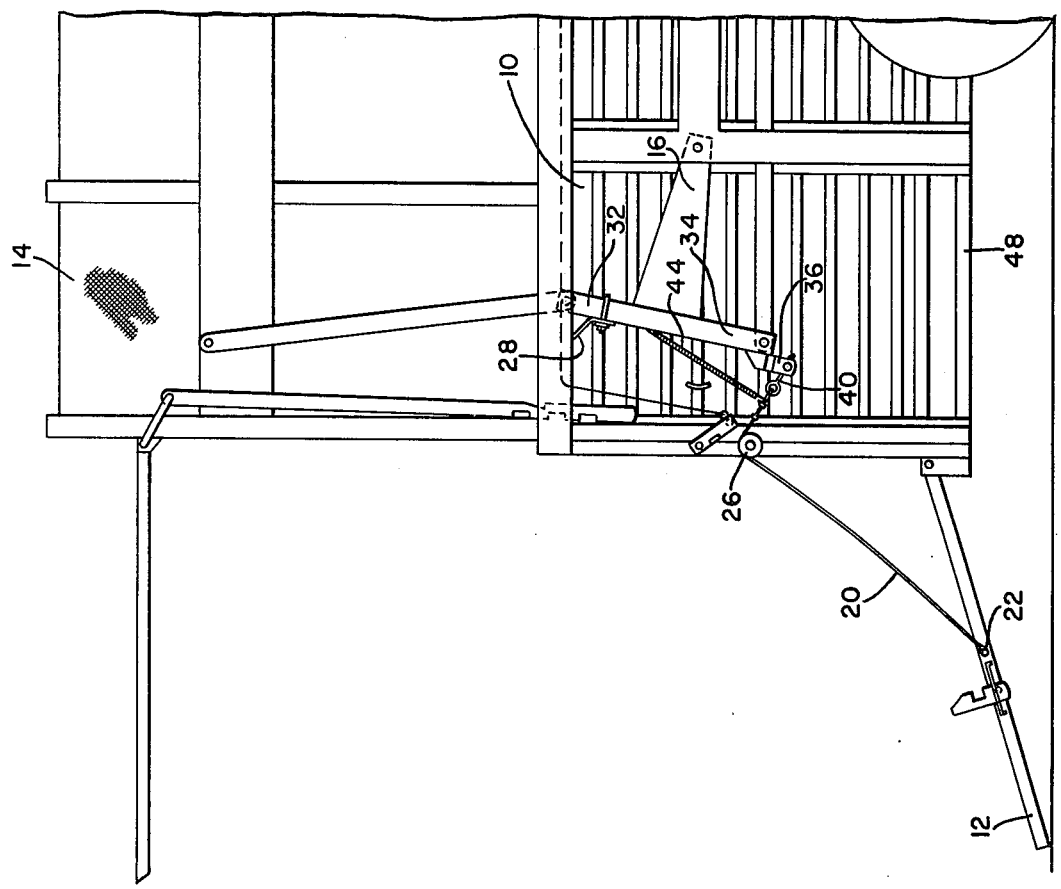
FIG. 3 is a side view of the rear portion of the implement showing the door fully opened and the roof lift mechanism in its relative position.
Figure 2:
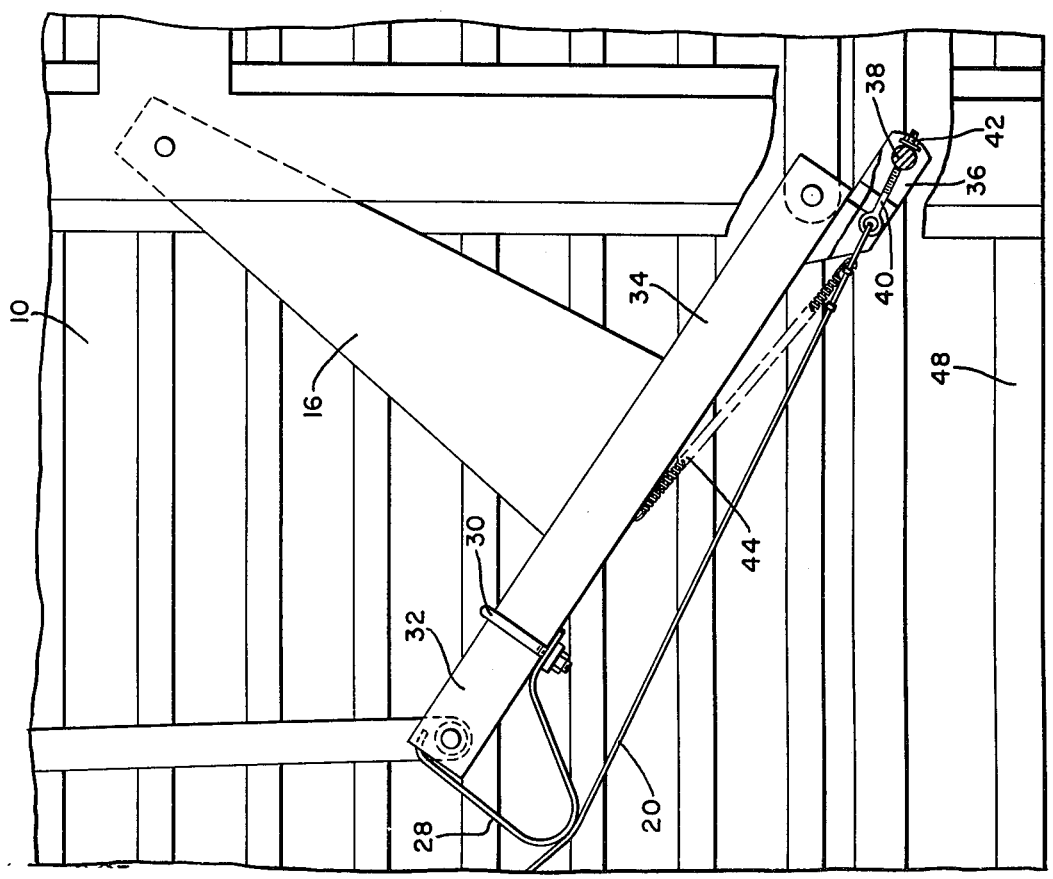
FIG. 2 is an enlarged side view with portions broken away of a section of the cable and the bell crank.

The stack-forming implement embodying the invention comprises, generally, a mobile frame adapted to be towed by a tractor, a crop-receiving container 10 carried by the frame and including a rear opening and door 12, a container top or roof 14 mounted for vertical reciprocal movement and operative to compress material in the container and a compressing mechanism for raising and lowering the container top 14. The compressing mechanism includes in part T-shaped bell cranks 16 and 18, pivotally mounted on the sides of the container and connected by links to the roof 16. The improved means for controlling door movement includes a flexible cable 20 interconnecting the rear door 12 and the rear T-shaped bell crank 16.

To the upper side portion of the rear door 12 is welded a transversely horizontal dowel-shaped rod 22. On the outer portion of the rod is a groove which circumscribes the entire rod circumference. Looped about the rod 22 and seated in the groove is the rearwardly portion of the flexible cable 20. Secured to the container frame forwardly of the door is a sheave 26. Swingably mounted on the container side for rotational movement about horizontally transverse axes are the compression mechanism T-shaped bell cranks 16 and 18. Attached to the lower surface of the rearward arm of the rear bell crank 16 is an arcuate part 28. The forward portion of the arcuate part 28 is secured by U-bolts 30, and the base of the L-shaped rearward portion of the arcuate part 28 is movably seated for up and down movement in an opening of the bell crank rear arm 32.

Welded to each side of the bottom of the forward arm 34 of the rearward bell crank 16 are brackets 36. Horizontally mounted between the brackets 36 is a transversely positioned pivotable rod 38. An adjustable eyebolt 40 extends through an opening in the rod 38 and a nut 42 is threaded on the eyebolt 40 forward end.

The cable 20 extends forwardly from the rear door dowel pin 22, around the sheave 26, slidingly contacts the arcuate part 28 mounted on the rear bell crank 16, and is secured to the loop of the eyebolt 40. A keeper spring 44 interconnects the cable loop adjoining the eyebolt 40 and the center bottom portion of the bell crank 16 and exerts an upwardly bias on the eyebolt 40.

The operation of the invention is as follows. When the stack has been completed, the compressor roof or top 14 is raised. As the operator activates the hydraulic cylinder 46 to rotate the bell cranks 16 and 18 to raise the compressor roof 14, the lower rear door 12 is opened through a latch mechanism described in detail in applicant's co-pening U.S. application Ser. No. 371,734 and not important for purposes herein. As the bell cranks 16 and 18 are rotated rearwardly, the cable 20 becomes slack. To prevent the rearward end of the eyebolt 40 from rotating downwardly about the pivotable shaft 38 as the bell crank 16 rotates rearwardly, and thereby jamming against the frame 48, the keeper spring 44 exerts an upwardly bias on the eyebolt 40 rearward end. As the roof 14 continues to raise, the door 12 is unlatched, and will then fall until the cable 20 contacts the arcuate part 28. The arcuate part 28 thus serves to cushion the fall of the door. The bell crank 16 swings through a fixed radius arc while the arcuate part 28 transcribes a different radius arc. Therefore the interaction of the arcuate part 28 with the cable 20 will diminish as the compressor roof 14 is raised and the arcuate part 28 swings away from the cable path.

After the stack is unloaded through the container rear opening and across the rear door 12, the operator need only lower the compressor top 14 to close the rear door.

As the hydraulic cylinder 46 retracts, the bell cranks 16 and 18 are rotated in a forwardly direction and the cable 20 is pulled forwardly. Since the linear distance of the arc swung by the bell crank 16 is less than the linear distance over which the rear door cable connection rod 22 travels to cause the door to close, slack in the cable will result after the bell crank 16 has been fully rotated and the compressor top 14 moved completely down. To eliminate that cable slack and thereby cause the door to close, the arcuate part 28 is secured to the bell crank 16 in a position wherein it would interact with the cable 20 and lengthen the path the cable would follow. As the arcuate part 28 slidably interacts with the cable 20, the length of the path through which the cable 20 is moved by the bell crank 16 is increased. The slack is thereby taken up and the rear door closed and latched. Minor adjustments in cable 20 length are effected by advancing or unscrewing the nut 42 on the forward end of the eyebolt 40.

It is claimed:

1. In an agricultural machine having a mobile frame, a crop-receiving container on the frame and including a discharge opening, a door hinged at its lower portion to the container and movable between open and closed positions as respects said opening; the improvement residing in means for controlling movement of the door between its open and closed position, comprising: a swingable bell crank having a pair of arms carried by the container for movement between first and second positions; a guide carried by the container above the door hinge; a cable trained over the guide and connected between one bell crank arm and the door for incurring opening of the door as the member moves toward its first position and closing of the door as the member returns toward its second position; and means movable by the other bell crank arm for engaging the cable to increase the tensioning force transferred to the cable by the bell crank as the bell crank moves.

2. The invention defined in claim 1 wherein the means movable includes an arcuate part carried by the other bell crank arm, said part bowed away from the cable.

3. The invention defined in claim 2 further characterized by the provision of a yieldable arcuate part having two ends with one end only fixed to the bell crank arm.

4. The invention defined in claim 3 wherein a lost motion connection secures the other end of the arcuate part to the bell crank arm.

5. In an agricultural machine having a mobile frame, a crop-receiving container on the frame and including a discharge opening, a door hinged at its lower position to the container and movable between open and closed positions as respects said opening; the improvement residing in means for controlling movement of the door between its open and closed position comprising: a swingable bell crank having a pair of arms carried by the container for movement between first and second positions; a guide carried by the container above the door hinge; a cable trained over the guide and connected between one bell crank arm and the door for incurring opening of the door as the member moves toward its first position and closing of the door as the member returns towards its second position; and means including a shock absorbing element carried by and movable with the other bell crank arm for engaging the cable to increase the tensioning force transferred to the cable by the bell crank as said bell crank moves.

6. The invention defined in claim 5 wherein the shock absorbing element includes an arcuate portion bowed away from the flexible element.

7. The invention defined in claim 6 further characterized by the provision of a yieldable arcuate part having two ends with one end only fixed to the bell crank arm.

8. The invention defined in claim 7 wherein a lost motion connection secures the other end of the arcuate part to the bell crank arm.

9. In an agricultural machine having a mobile frame, a crop-receiving container carried by the frame and including a discharge opening, a door hinged at its lower portion of the container and movable between open and closed positions as respects said opening; the improvement residing in means for controlling movement of the door between its open and closed position, comprising: a flexible element connected at one end to an upper portion of the door; a movable member on the container and connected to the other end of the flexible element for relaxing said flexible element as the door moves to its open position and for tensioning said element to move the door to its closed position; and an arcuate part for applying additional tensioning to the flexible element, carried by said member and movable therewith, fixed at its one end, having a lost motion connection at its other end and being of resilient material so as to yield upon engagement with the flexible element, and bowed away from the flexible element so as to apply additional tensioning to said element to assure door closing as the member moves the flexible element and the door towards a closed position.

10. The invention defined in claim 9 wherein the movable member is a bell crank having two arms, one arm connected to the flexible element, and the other arm carrying the arcuate part.

11. The invention defined in claim 9 wherein the flexible element is a cable, the movable member is a bell crank having a first and second arm and the invention is further provided with a guide carried by the container over which the cable is trained and interconnects one bell crank arm and the door for incurring opening and closing of said door.

* * * * *

UNITED STATES PATENT OFFICE
CERTIFICATE OF CORRECTION

Patent No. 4,046,069      Dated 6 September 1977

Inventor(s) Glenn Dale Head

It is certified that error appears in the above-identified patent and that said Letters Patent are hereby corrected as shown below:

Column 4, line 29, delete "of" and insert --to--.

Signed and Sealed this

Sixteenth Day of May 1978

[SEAL]

Attest:

RUTH C. MASON
Attesting Officer

LUTRELLE F. PARKER
Acting Commissioner of Patents and Trademarks